UNITED STATES PATENT OFFICE 2,473,392

DRILLING MUD CONTAINING GELATINIZED STARCH AND MONOETHANOL AMMONIUM 2-BENZOTHIAZYL SULFIDE

William F. Russell, Norwalk, Conn., assignor to R. T. Vanderbilt Company, Inc., New York, N. Y., a corporation of New York No Drawing. Application April 11, 1947, Serial No. 740,976

4 Claims. (Cl. 252—8.5)

My invention relates to improvements in the control of water-base drilling muds containing gelatinized starch.

In the rotary drilling of wells, for the production of petroleum or natural gas for example, a drilling fluid is circulated downwardly through a hollow drill stem, by which a bit carried at its lower end is driven from the surface of the ground, to the bottom of the bore and thence upwardly through the space between the drill stem and wall of the bore. This drilling fluid serves a number of functions. It cools and lubricates the bit and it carries the cuttings out of the bore. Its head in the bore establishes the pressure which tends to prevent the escape of gas or oil due to such pressures as may exist into formations through which the bore passes. Weighting materials such as barytes are commonly suspended in such drilling fluids to increase their density and thus to increase the pressure imposed by the drilling fluid when high formation pressures are encountered. Materials such as bentonitic clays are commonly suspended in such drilling fluids to assist in carrying cuttings from the bore, to assist in suspending weighting materials, to retard the settling of cuttings and weighting materials within the bore during periods when the circulation is interrupted and to build a wall on the bore tending to prevent the loss of drilling fluid, or of the liquid component of the drilling fluid, into porous formations. Gelatinized starch is peculiarly effective for this last purpose in water-base drilling fluids. Gelatinized starch is peculiarly effective for all of these purposes in water-base drilling fluids where salt is encountered. Clay constituents are added as cuttings to the drilling fluid used in any bore traversing clay or shale formations and, consequently, such drilling fluids are appropriately termed "muds" whether or not other clay material is also added to the drilling fluid.

In water-base drilling muds, starch promotes the formation of a tenacious but relatively thin adherent cake on the wall of the bore which suppresses to a remarkable degree the loss of water from the mud to formations through which the bore passes. These properties, "wall building" and "water loss," are conventionally measured by a standard filter test which is described for example on pages 163–4 of Brantly's Rotary Drilling Handbook, Third Edition Revised (1942). With appropriate additions of starch, drilling fluids exhibiting water loss of less than 1 cubic centimeter, thus measured, can be developed. The special values of water-base drilling muds containing starch have long been recognized, for example in the production of petroleum and natural gas, but the use of such muds has involved a problem which has not hitherto been satisfactorily solved. This problem arises from the circumstance that, in such muds, gelatinized starch tends to ferment and, usually, to ferment rapidly. Quite apart from difficulties such as those caused by the formation of malodorous decomposition products, such fermention creates a special technical problem and an economic problem. The fermentation results in the liberation of gas and, liberated within the mud, such gas tends to be dispersed in and retained by the mud and thus to reduce, substantially, the density of the mud. In the field, such mud is referred to as "gas-cut." The effective separation of entrained gas from a gas-cut mud is always difficult and sometimes impossible. The gas-cut mud is useless because it interferes with regular circulation and because it is ineffective to establish the head pressure usually required to restrain the escape of high pressure formation fluids. If the head pressure established by the drilling fluid is insufficient for this purpose, the formation fluids expel the drilling fluid from the bore, sometimes with explosive violence, such an event being termed a "blow-out." The economic problem is represented by the loss of mud which must be replaced. The amount of mud required at any one time in one bore is usually measured in hundreds of barrels.

My invention relates particularly to improvements in the control of micro-biological degradation of water-base drilling muds containing gelatinized starch, or more particularly of the starch component of such muds. My invention is generally useful in application to drilling muds of this character. In summary, I have discovered that the incorporation in such muds of a proportion of monoethanol ammonium 2-benzothiazyl sulfide small enough to be economically feasible and small enough not to interfere with the functions of the mud in the drilling operation will effectively suppress fermentation of the starch component. Further, I have found that the addition of a small proportion of a polyoxyethylene stearate to such muds, treated with monoethanol ammonium 2-benzothiazyl sulfide, assists in stabilizing the mud particularly with respect to viscosity.

Hitherto, two general attacks have been made on this problem. Fermentation can be suppressed by making and keeping the mud strongly alkaline, but the alkalinity required is so high, a pH higher than about 11 is usually required, that this attack is useful only in limited situations. The other attack has been to incorporate in the mud some agent intended to suppress micro-biological degradation. The precise nature of the fermentation has not been understood and some of the materials tried have been ineffective in that they were not properly related to the cause of the fermentation. Other materials have been ineffective when used in proportions small enough to avoid interference with the functions of the mud and to be permissible in terms of cost. Other materials have apparently been effective when first incorporated in the mud but have rapidly lost their capacity to suppress the degradation. Tremendous areas of earthy material, in the mud and in the bore, are of course available to adsorb such materials and thus to render them ineffective. Also, although ordinary mud temperatures at the surface of the ground may approximate 90° F.–130° F., at the lower end of deep bores the mud may be cyclically subjected to temperatures as high as 250° F. Exposure to such temperatures has probably rendered some materials ineffective.

In carrying out my invention, I incorporate about 2%–4% by weight on the starch component of the mud of monoethanol ammonium 2-benzothiazyl sulfide, either by adding it to the water-base drilling mud comprising gelatinized starch or by adding it to starch to be made up into mud. The proportion of starch used in such muds varies widely, being adapted by the operator to the particular situation in each instance. A proportion of starch approximating 3.5% by weight on the total mud may be taken as representative; the proportion may range from this figure down to less than 1% and up to as much as 4% or 5% or more. In applying my invention, the operator uses the starch as he would have used it without reference to my invention but also incorporates in the mud the stated proportion of monoethanol ammonium 2-benzothiazyl sulfide. In a representative mud embodying my invention, the proportion of monoethanol ammonium 2-benzothiazyl sulfide may approximate, for example, one half pound per barrel of mud. The cost is reasonable. The losses are relatively low. Resistance to the temperatures encountered in the bore is satisfactory. For example, in a conventional water-base drilling mud comprising 3.5% by weight on the mud of gelatinized starch, the original incorporation of 3.6% by weight on the starch of monoethanol ammonium 2-benzothiazyl sulfide effectively suppressed micro-biological degradation for a test period of twenty days. I have also found it advantageous to incorporate in the mud about 0.1%–1% by weight on the starch of a polyoxyethylene stearate containing 2–20 ethylene oxide groups to assist in suppressing viscosity changes in water-base muds comprising gelatinized starch over the long periods for which such muds are useful when treated with monoethanol ammonium 2-benzothiazyl sulfide in accordance with my invention.

My invention includes water-base drilling muds comprising gelatinized starch and the stated proportions on the starch of monoethanol ammonium 2-benzothiazyl sulfide. In the course of a rotary drilling operation, the mud will change in volume and in character. This volume will increase as the bore becomes deeper and its character will change as formation constituents are added to it. In some operations, particularly when the bore is traversing clay or shale formations, the bore materials may make satisfactory mud. In such instances additional volumes of mud are derived by the addition of water to the circulating fluid. In other operations, the additional volumes of mud required may have to be mixed, as a step in the surface operations, and added to the circulating fluid. And many operations fall between these two classes. As starch is added to adjust or maintain the proportion of starch on the drilling mud as the volume of mud increases, in carrying out my invention, corresponding proportions of monoethanol ammonium 2-benzothiazyl sulfide are incorporated in the mud, either by direct addition to the mud or by addition with the starch. Such additions of starch and such additions of monoethanol ammonium 2-benzothiazyl sulfide may be made from time to time as the drilling operation progresses just as weighting materials or clays or other treating agents are added to the circulating drilling fluid. The monethanol ammonium 2-benzothiazyl sulfide is with advantage added to the starch in the stated proportions prior to addition of the starch to the mud since the proportion of monoethanol ammonium 2-benzothiazyl sulfide to be used is determined by reference to the starch rather than by reference to the mud in which the starch may be used in varying proportions. My invention includes gelatinized starch containing about 2%–4% by weight on the starch of monoethanol ammonium 2-benzothiazyl sulfide.

Monoethanol ammonium 2-benzothiazyl sulfide can be prepared by heating a mixture of 16.7 parts by weight of 2-mercaptobenzothiazole and 6.1 parts of monoethanolamine, with stirring, until it melts to form a brown liquid. Upon cooling, the melt solidifies. This solidified melt can be ground to yield a pulverulent product, dark green in color and having a melting point of about 93°–95° C. which is satisfactory for the purposes of my invention. This melt can be purified, for example by recrystallization, to yield a product light yellow in color and having a melting point of 103°–105° C. which is also satisfactory for the purposes of my invention. To assist in dispersion in the starch or in the water-base drilling mud, the monoethanol ammonium 2-benzothiazyl sulfide should be ground to a fine powder, 90% through a 200-mesh screen or finer, for example. My invention also includes monoethanol ammonium 2-benzothiazyl sulfide as a new product. It is useful in water-base drilling muds comprising gelatinized starch as previously described, and it is also useful in other applications for control of micro-biological activity. Polyoxyethylene stearates containing 2–20 ethylene oxide groups are commercially available.

I claim:

1. Gelatinized starch containing about 2%–4% by weight on the starch of monoethanol ammonium 2-benzothiazyl sulfide.

2. Gelatinized starch containing about 2%–4% by weight on the starch of monoethanol ammonium 2-benzothiazyl sulfide and about 0.1%–1% by weight on the starch of a polyoxyethylene stearate containing 2–20 ethylene oxide groups.

3. A drilling mud comprising predominately an aqueous suspension of heavy solids to which has been added gelatinized starch and about 2%–4% by weight on the starch of monoethanol ammonium 2-benzothiazyl sulfide.

4. A drilling mud comprising predominately an aqueous suspension of heavy solids to which has been added gelatinized starch and about 2%-4% by weight on the starch of monoethanol ammonium 2-benzothiazyl sulfide and about 0.1%-1% by weight on the starch of a polyoxyethylene stearate containing 2-20 ethylene oxide groups.

WILLIAM F. RUSSELL.

REFERENCES CITED

The following references are of record in the file of this patent:

UNITED STATES PATENTS

| Number | Name | Date |
|---|---|---|
| 1,574,638 | Tamanaha | Feb. 23, 1926 |
| 2,024,605 | Sebrell | Dec. 17, 1935 |
| 2,070,523 | Clifford | Feb. 9, 1937 |
| 2,209,591 | Barnes | July 30, 1940 |
| 2,271,695 | Jones | Feb. 3, 1942 |
| 2,273,925 | Bond | Feb. 24, 1942 |
| 2,339,002 | Cooper | Jan. 11, 1944 |
| 2,387,834 | Davis | Oct. 30, 1945 |
| 2,417,307 | Larsen | Mar. 11, 1947 |